(12) United States Patent
Bean et al.

(10) Patent No.: US 11,321,526 B2
(45) Date of Patent: May 3, 2022

(54) DEMONSTRATING TEXTUAL DISSIMILARITY IN RESPONSE TO APPARENT OR ASSERTED SIMILARITY

(71) Applicant: INTERNATIONAL BUSINESS MACHINES CORPORATION, Armonk, NY (US)

(72) Inventors: Rob Bean, Mahopac, NY (US); Alexis Nicole Hatzis Liakas, New York, NY (US); Anthony Mauricio Pallone, Hopewell Junction, NY (US); Reza Sarbakhsh, New York, NY (US); Kriteshwar Kaur Kohli, White Plains, NY (US); Charles Christopher Walker, Cary, NC (US); Raj Nagesh, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 90 days.

(21) Appl. No.: 16/826,748

(22) Filed: Mar. 23, 2020

(65) Prior Publication Data

US 2021/0294973 A1   Sep. 23, 2021

(51) Int. Cl.
*G06F 17/00* (2019.01)
*G06F 40/279* (2020.01)
(Continued)

(52) U.S. Cl.
CPC ........ *G06F 40/279* (2020.01); *G06F 3/04842* (2013.01); *G06F 40/30* (2020.01);
(Continued)

(58) Field of Classification Search
CPC .... G06F 40/279; G06F 40/30; G06F 3/04842; G06K 9/00483; G06K 9/6211;
(Continued)

(56) References Cited

U.S. PATENT DOCUMENTS

| | | | |
|---|---|---|---|
| 7,421,418 B2 * | 9/2008 | Nakano | G06F 16/334 706/52 |
| 9,129,036 B2 * | 9/2015 | Dexter | G06F 16/8373 |

(Continued)

OTHER PUBLICATIONS

Binisha, "Ontology Based Text Clustering Using the Dissimilarity Measure", Proceedings of the International Conference on Communication and Computational Intelligence—2010, Dec. 27-29, 2010, pp. 476-480.

(Continued)

*Primary Examiner* — Laurie A Ries
(74) *Attorney, Agent, or Firm* — Anthony Curro

(57) ABSTRACT

A system identifies a first text fragment as being under evaluation, wherein the first text is in at least a first document being compared to a second document using a first semantic model. The system compares the first text fragment to one or more text fragments of the second document. The system identifies top-k text fragments in the second document that are most similar to the first text fragment based on processing using the first semantic model. The system presents a user, via a graphical user interface (GUI), the top-k text fragments in visual proximity to the first text fragment.

15 Claims, 8 Drawing Sheets

(51) Int. Cl.
*G06F 40/30* (2020.01)
*G06F 3/04842* (2022.01)
*G06K 9/62* (2022.01)
*G06V 10/75* (2022.01)
*G06V 30/418* (2022.01)

(52) U.S. Cl.
CPC ......... *G06K 9/6215* (2013.01); *G06V 10/757* (2022.01); *G06V 30/418* (2022.01)

(58) Field of Classification Search
CPC .. G06K 9/6215; G06V 10/757; G06V 30/418; G06V 10/82; G06V 30/19093
See application file for complete search history.

(56) References Cited

U.S. PATENT DOCUMENTS

| | | | | |
|---|---|---|---|---|
| 9,189,482 B2* | 11/2015 | Danielyan | ............. | G06F 40/194 |
| 9,224,041 B2* | 12/2015 | Dejean | ............... | G06K 9/00469 |
| 10,614,345 B1* | 4/2020 | Tecuci | ................ | G06K 9/6272 |
| 11,170,175 B1* | 11/2021 | Kohli | .................... | G06F 40/284 |
| 2003/0212541 A1* | 11/2003 | Kinder | ................... | G06F 40/20 |
| | | | | 704/4 |
| 2007/0179776 A1* | 8/2007 | Segond | ................. | G06F 16/332 |
| | | | | 704/9 |
| 2009/0327277 A1* | 12/2009 | Sanborn | ................ | G06F 16/907 |
| | | | | 707/999.005 |
| 2010/0107045 A1* | 4/2010 | Filippova | ............. | G06F 40/134 |
| | | | | 715/205 |
| 2012/0078612 A1* | 3/2012 | Kandekar | ............ | G06F 3/0482 |
| | | | | 704/9 |
| 2014/0164352 A1* | 6/2014 | Denninghoff | ............ | H03H 9/25 |
| | | | | 707/711 |
| 2016/0292276 A1* | 10/2016 | Denninghoff | ............ | H03H 9/25 |
| 2017/0228369 A1* | 8/2017 | Zelenkov | ................ | G06F 40/30 |
| 2018/0300315 A1* | 10/2018 | Leal | ...................... | G06F 40/268 |
| 2020/0065384 A1* | 2/2020 | Costello | ............... | G06N 3/0454 |
| 2020/0387673 A1* | 12/2020 | Beaver | ................. | G06K 9/6263 |
| 2021/0011961 A1* | 1/2021 | Guan | ..................... | G06N 20/00 |
| 2021/0248322 A1* | 8/2021 | Modani | .............. | G06F 9/30036 |

OTHER PUBLICATIONS

Dias, et al., "Using text analysis to quantify the similarity and evolution of scientific disciplines", Royal Society Open Science, Jan. 17, 2018, 12 pgs.

Forsyth, et al., "Document Dissimilarity within and across Languages: a Benchmarking Study," Literary & Linguistic Computing, Feb. 5, 2013, 31 pgs.

Lewis, "The interpretation And Uniformity of the UNCITRAL Model Law on International Commercial Arbitration", Kluwer Law International B.V., Mar. 22, 2016, 314 pgs.

Mell et al., "The NIST Definition of Cloud Computing", National Institute of Standards and Technology, Special Publication 800-145, Sep. 2011, 7 pages.

Pinheiro, et al."Combining dissimilarity spaces for text categorization", Information Sciences, Apr. 2017, ResearchGate, 16 pgs.

* cited by examiner

FIG. 4

DEMONSTRATING TEXTUAL DISSIMILARITY IN RESPONSE TO APPARENT OR ASSERTED SIMILARITY

BACKGROUND

This invention relates generally to computerized natural language processing (NLP), and particularly to semantic similarity.

Natural language processing (NLP) is a branch of artificial intelligence in computer science. One NLP function is to train and use machine learning (ML) models that can be used in textual analysis. For example, the trained models can be used to determine whether and to what extent two texts or documents are similar to one another.

Two examples of machine models are word embedding and bag-of-word models.

Word embedding is an NLP technique that uses a machine learning model, such as a neural network, to map tokens (words or phrases) from an input vocabulary to a vector of real numbers. For example, sentences stored in a text corpus may processed using, a word embedding technique, to generate a set of semantic vectors; for example, one semantic vector for each processed token.

Bag-of-words is another NLP technique in which a text is represented as a multiset (a "bag") of its constituent words.

SUMMARY

Embodiments of the invention provide for methods, computer program products, and systems for performing semantic analysis and providing GUIs for use by a user.

In an embodiment, a method identifies a first text fragment as being under evaluation, wherein the first text is in at least a first document being compared to a second document using a first semantic model. The method compares the first text fragment to one or more text fragments of the second document. The method identifies top-k text fragments in the second document that are most similar to the first text fragment based on processing using the first semantic model. The method presents a user, via a graphical user interface (GUI), the top-k text fragments in visual proximity to the first text fragment.

According to embodiment, a computer system is provided for performing the above method.

According to an embodiment, a computer program product is provided for performing the above method.

BRIEF DESCRIPTION OF THE SEVERAL VIEWS OF THE DRAWINGS

FIG. 4 is an illustrative graphical user interface (GUI) 400, according to an embodiment of the invention.

DETAILED DESCRIPTION

Figure 1:
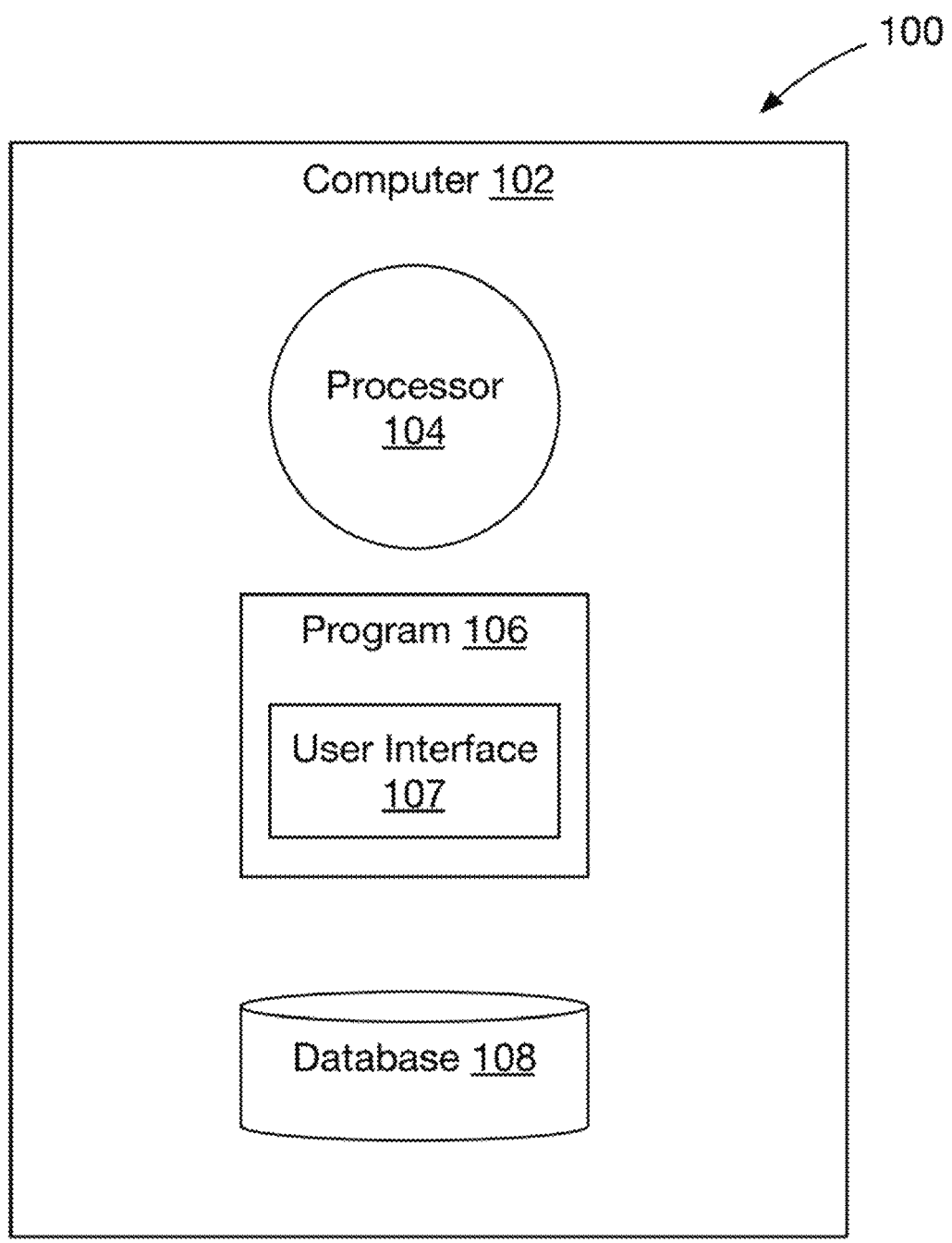
FIG. 1 is a functional block diagram of a computing environment 100 according to an embodiment of the invention.

A task of interest in a variety of computer-based NLP applications and workflows is to determine whether two electronic documents, or two text fragments in them, are similar or dissimilar.

Known NLP solutions provide only a one-dimensional analysis of textual similarity. Textual similarity and dissimilarity often are merely inverse functions of one another: if two text fragments are 60% similar, they are 40% dissimilar.

There exists, however, a class of natural language processing tasks that requires demonstrating dissimilarity in response to an apparent or asserted similarity; and conversely, demonstrating similarity in response to an apparent or asserted dissimilarity.

There are currently no known technical solutions that provide these functions in a systematic way.

Embodiments of the invention provide computer implemented methods, computer program products, and computer systems that assist a user in discovering, assessing, and demonstrating semantic dissimilarity in response to an apparent or asserted similarity between two text fragments; and conversely, demonstrating similarity in response to apparent or asserted dissimilarity between two text fragments. A difference between at least some embodiments of the present invention and the prior art is that measures of similarity and measures of dissimilarity are distinct features used for document or text classification. The prior art does not simultaneously take two text fragments as being most similar and generate indicia in support of asserting that they are semantically most dissimilar; or vice versa.

One reason for this deficiency in prior art solutions is that they primarily are concerned with the following: given a first text fragment, what other text fragment is most similar to it? Or how can dissimilarity of two text fragments be quantified? The prior art does not ask: given two text fragments being asserted as (or appearing to be) similar or identical, what is the best indicia of their dissimilarity that can be used to argue that the two are semantically dissimilar? In other words, given the same input, how can a computer aid a user in determining that two apparently identical or similar texts are in fact dissimilar; or vice versa.

Some embodiments of the invention define functions that are performed uniquely in response to detecting an apparent or asserted similarity that would not otherwise be performed when performing traditional similarity or dissimilarity determinations.

Embodiments of the invention can be embodied as a method, a computer program product, or a system.

Consider an illustrative scenario where a task of interest for User A is to make a factual statement or argument in support of a proposition or find the most similar textual evidence confirming the veracity of a given text; for example Text1. It may be desirable, therefore, for User A to find and assert that Text1 is identical or similar to Text2; and to quantify the similarity.

User B may be interested in the opposite; i.e., asserting that Text1 is neither identical nor similar to Text2. This may help User B with a task of interest, such as refuting User A's factual statement or argument.

Humans can perform this comparison task intuitively, using skills, training, and experience. However, replicating this process in a computer system, or even configuring the computer system to augment comparisons by humans, presents significant and non-trivial technical challenges. Solving these challenges requires more than mere automation of analysis steps or textual analysis that a human performs using mental processes, or even pen and paper.

What is needed, therefore, is a computer-based solution that performs textual similarity and dissimilarity via a technical solution, improving the manner in which a computer aids a human in completing relevant workflows.

For example, given two documents or texts, embodiments of the invention provide mechanisms to select which portions to display to a user to aid in the user's performance of textual analysis.

Existing solutions use a variety of techniques in the field of artificial intelligence, such as natural language processing. Some approaches use, for example, machine learning (for example, a neural network) to train data models that classify text as similar or dissimilar to a text fragment under consideration. A variety of statistical and scoring techniques can be used to define and quantify measures of similarity or dissimilarity.

Embodiments of the invention will now be described in greater detail in connection with the various Figures.

FIG. 1 is a functional block diagram of a computing environment 100 according to an embodiment of the invention. In FIG. 1, computing environment 100 includes computer 102, whose general structure and components may be those described in connection with FIG. 6, below.

Computer 102 includes a processor 104, a program 106 (including a user interface (UI) or graphical user interface (GUI) 107), and a database 108.

Processor 104 generally processes programming instructions of program 106 to perform one or more methods and interacts with a user via GUI 107. Program 106 operates on data stored (or to be stored) on database 108; each database stores one or more records. Program 106 and the databases are stored on a tangible storage medium of computer 102. It shall be apparent to a person of ordinary skill in the art that although one computer, one processor, one program (and some databases) are depicted in FIG. 1, these components can be distributed among more than one computing device, and may be provided via cloud computing or other distributed computing models, without diverging from the spirit or scope of the claimed invention.

Database 108 generally includes data on which various NLP tasks of interest are to be performed or data produced by practicing embodiments of the invention; such as blocks of text, a text corpus of training data, user feedback, semantic scores, and other data.

Figure 2:
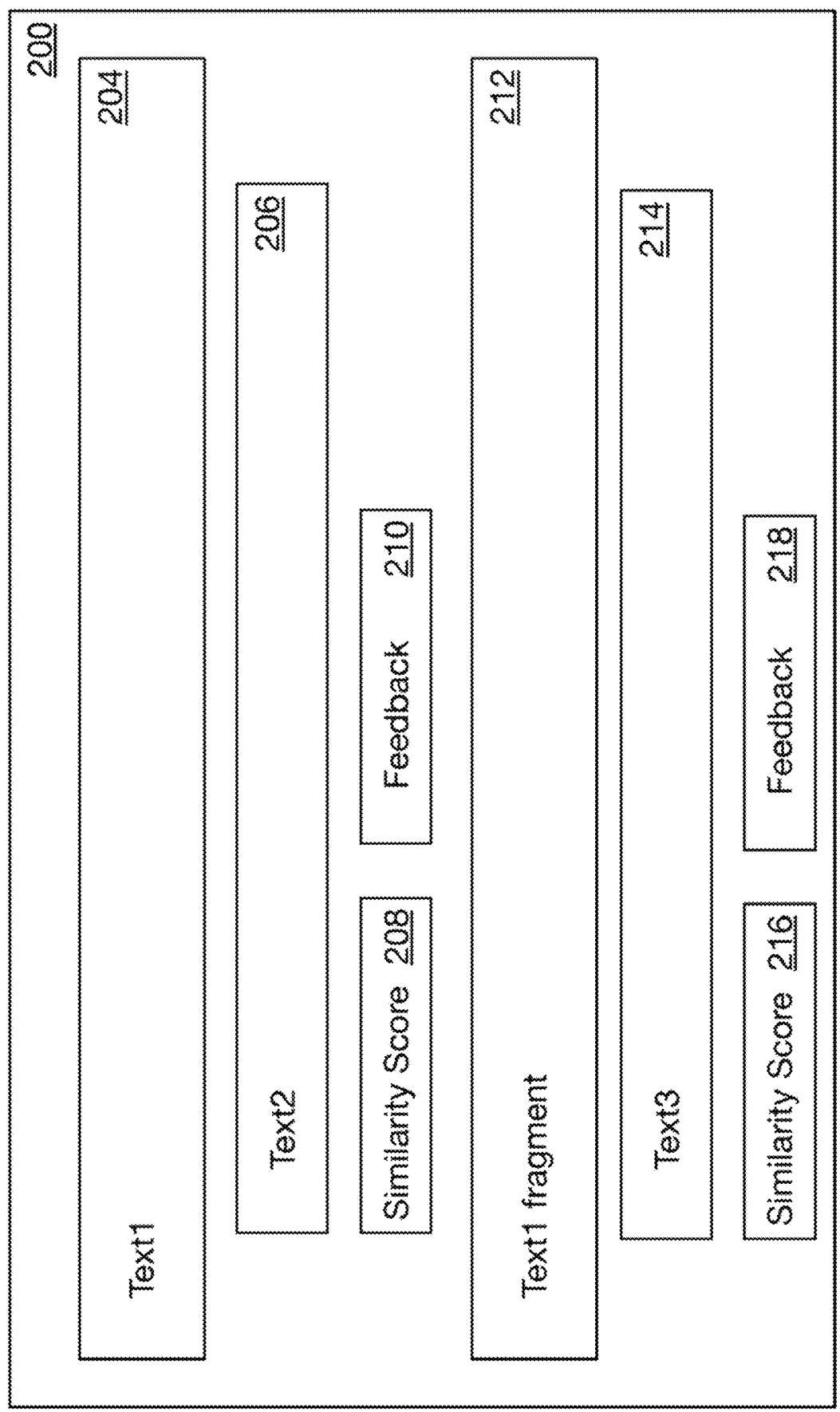
FIG. 2 is an illustrative graphical user interface (GUI) 200, according to an embodiment of the invention.

FIG. 2 is an illustrative graphical user interface (GUI) 200, according to an embodiment of the invention. GUI 200 generally displays a text fragment 204 (for example, Text1) under consideration or evaluation. In one embodiment, a text fragment is under consideration when, in a task of interest, a user wishes to analyze the semantic similarity of the text fragment in a first document relative to one or more other text fragments in the same document or in one or more other documents. In an embodiment, a text fragment is under consideration when the text fragment has been asserted to be semantically similar to at least one other text fragment in the same document or in another document. For example, this may be the case where, in a database of semantically analyzed text, text fragment 204 is associated with a semantic analysis result (such as similar, dissimilar, or via a score, such as a percentage or a real number between 0-1, among other measures of similarity).

GUI 200 generally also displays a text fragment 206, for example Text2. Text2 may be from the same document as Text1, or from another document. In an embodiment, Text2 is from a second document to which the document of Text1 is being compared. In an embodiment, Text1 appears in a first document, is references in a second document, and is being compared to text in a third document. In an embodiment, text fragment 206 is selected for displaying in close proximity to text fragment 204 based on text fragment 206 being among a top-k set of text fragments, found in one or more documents, that are most similar to text fragment 204.

Text fragment 206 is displayed in visual proximity to text fragment 204, as well as to a similarity score 208 and a feedback UI component 210. Similarity score 208 represents a measure of similarity between text fragment 206 and text fragment 204. In an embodiment, similarity score 208 may be said to be an asserted similarity between the two text fragments. In an embodiment, similarity score 208 may be said to be actually, explicitly, or affirmatively asserted. In another embodiment, similarity score 208 may be said to be an asserted similarity based on a natural language statement in a document (for example, the second document discussed above) that states that text fragment 204 is identical or similar to text fragment 206. In an embodiment, similarity score 208 quantifies or measures a similarity between the two text fragments implied by an assertion of similarity between text fragment 204 and at least one other text fragment; or between text fragment 206 and at least one other text fragment.

In an embodiment, visual proximity between two GUI components means that the two are viewable in a single GUI window (or on the same display device). In an embodiment, the two components are viewable in a single GUI window (or display device) at the same time.

GUI 200 also includes text fragment 212, which is a fragment (or sub-fragment) of text fragment 204. For example, if text fragment 204 is a paragraph, text fragment 212 may be a section of that paragraph; if text fragment 204 is a sentence, text fragment 212 may be a clause within the sentence. Other fragmentations are contemplated by embodiments of the invention.

Text fragment 212 (also referred to as Text3), is similar to text fragment 206, in that it is a top-k text fragment, but relative to text fragment 212. Similarity score 216 is similar to similarity score 208, but relative to text fragment 212.

An advantage of GUI 200 and the displayed configuration of text fragment 204 and text fragment 212 is that in a single visual display, a user can see a text fragment under evaluation and top-k text fragments to examine actually or potentially identical, similar, or dissimilar texts, in the same interface, so that, using indicia of dissimilarity, the user can quickly formulate arguments against actual or potential assertions of similarity. An additional advantage of the GUI 200 is that similarity scores generated using computer models depend on the size of their input texts. For example, in a word embedding model (for example, a trained neural network) that generates a vector representation of texts that it compares, the size and content of the text fragment will impact the semantic comparison and the resulting scores; such that the score of comparison between Text1 and a given paragraph of a second or third document is likely to be different from the score of comparison between Text2 and the same given paragraph. Therefore, in some embodiments, providing the user with information about Text2 provides the user with a technological tool for a more granular and detailed examination of relevant text.

A person of ordinary skill in the art shall appreciate that the same interface may be used to display dissimilarity scores (rather than similarity scores 208 and 216), and top-k most dissimilar texts (rather than top-k text fragments 206 and 214).

Figure 3:
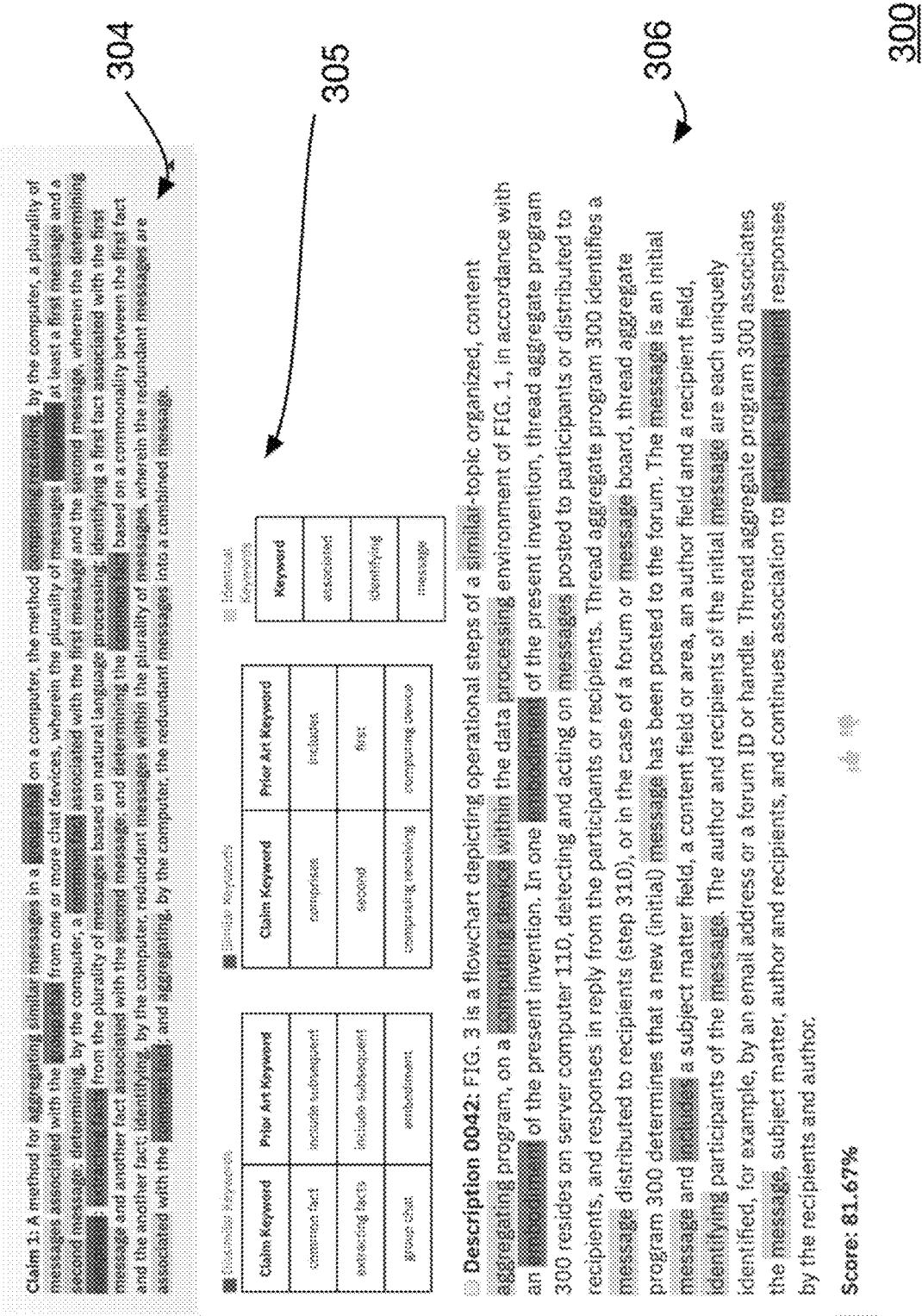
FIG. 3 is an illustrative graphical user interface (GUI) 300, according to an embodiment of the invention.

FIG. 3 is an illustrative graphical user interface (GUI) 300, according to an embodiment of the invention. In GUI 300, three components are shown. A first text fragment 304 (similar to text fragment 204 of FIG. 2), a table 305, and a text fragment 306 (similar to text fragment 206 of FIG. 2). GUI 300 is an example of a first text fragment 304 being compared to one or more text fragments (such as paragraphs) of another document; and the top-k most similar paragraphs (here, k=1), being displayed in visual proximity to the text fragment under evaluation. Table 305 is an exemplary key for interpreting visual styles used in GUI 300 to communicate to the user similarities and dissimilarities between text fragments. For example, in GUI 300, the color red in text fragment 304 identifies words or phrases therein which do not appear in text fragment 306 to which it has been compared (with a similarity score of 81.76%). The color red in text fragment 306 identifies words therein which do not appear in text fragment 304. The color green indicates words or phrases that appear in each text that are similar to words or phrases in the other. The color gray indicates identical words.

Using this information, a user can evaluate the veracity of the similarity score; i.e., given the actual or apparent assertion of 81.76% similarity, what is the best evidence of dissimilarity between the two text fragments? The user can make this examination and perform this analysis using embodiments of the invention.

It should be noted that in populating GUI 300, program 106 (FIG. 1) has a choice amongst hundreds or thousands of paragraphs or other text fragments. The choice of which paragraph to load into GUI 300 (or other disclosed GUIs) is based on computer processing of electronic natural language text using computing technologies such as machine learning, data modeling, natural language processing, neural networks, and more generally, artificial intelligence. The same is true of the choice of which text fragments to load into text fragment 306. In some embodiments, text fragment 304 may have been compared to over 100,000 other text fragments using machine learning models whose output includes a similarity score. Processing all these paragraphs to determine indicia of dissimilarity despite apparent similarity is a non-trivial and technical task, as it improves the speed of natural language processing applications by minimizing the amount of processing required. For example, processing all 100,000-plus paragraphs to determine indicia of similarity may take hours or days (depending on queuing and processing capacities; for example, on a cloud service) and can lead to job processing stalling or crashing all together. This and other embodiments address these technical challenges by combining targeted semantic analysis and GUIs to assist users in shaping the process by which a computer performs natural language processing tasks of interest.

Figure 4:
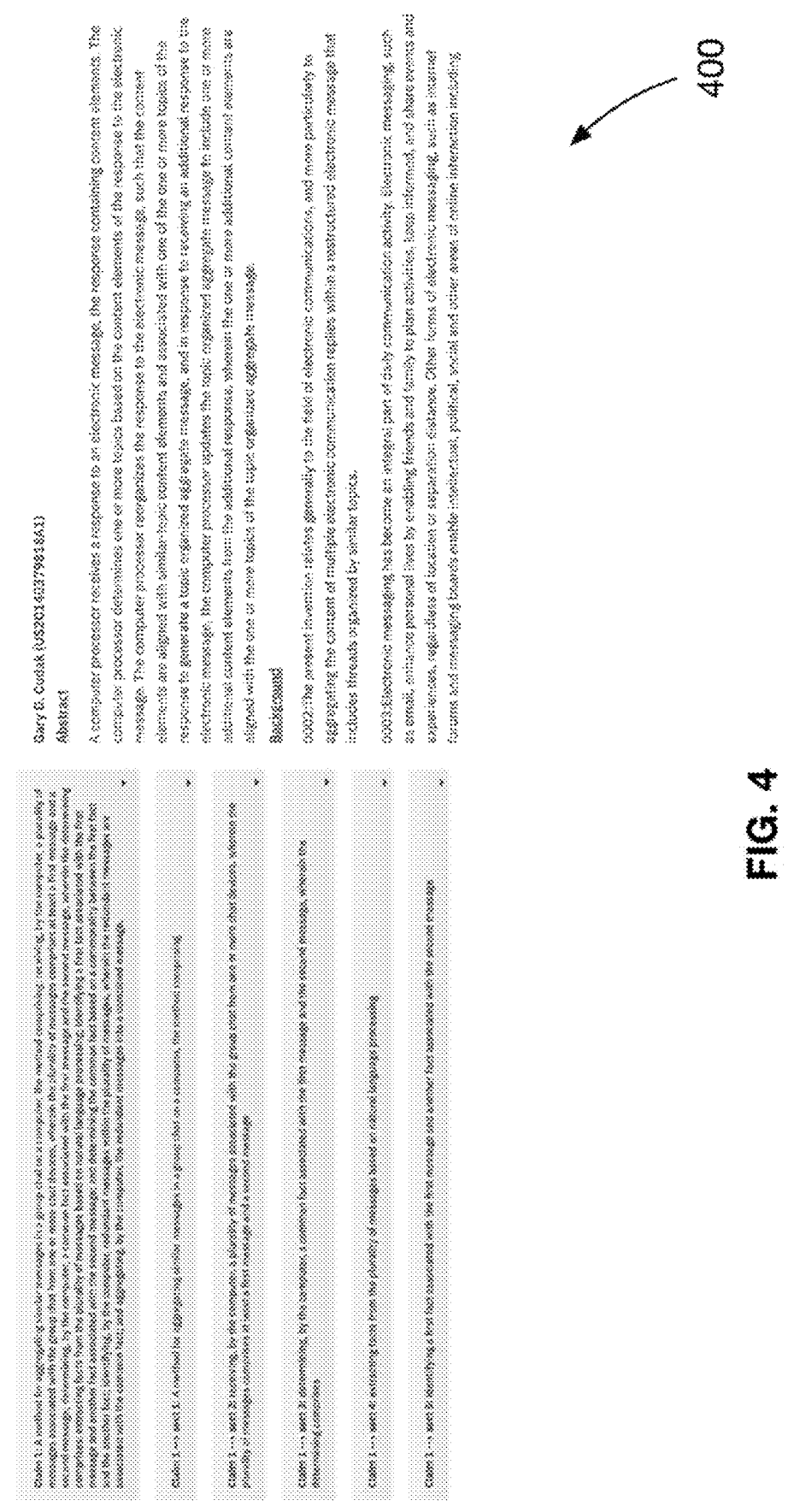

FIG. 4 is an illustrative graphical user interface (GUI) 400, according to an embodiment of the invention. GUI 400 is an example of a side-by-side view of text fragments and reference documents. For example, in the depicted example, each of the text fragments in the left pane has been compared to each paragraph of the document in the right pane, and their semantic similarities have been measured using similarity scores. A user can traverse the text fragments in the left and quickly identify which paragraphs of the document in the right the user should focus her evaluation on.

Under the prior art and without the use of GUIs 200, 300, and 400, a user performing a task of interest must examine one or more documents containing the text fragments, and then the reference document, using keyword searches via search interfaces of word processor or PDF viewer applications. This approach has many disadvantages because the task of interest is not finding what is most similar between two documents or their text fragments; and the task of interest is not to determine what is most dissimilar between two documents or their text fragments. Rather, the task is to analyze dissimilarity in light of actual or apparent asserted similarity; or vice versa. Performing this task of interest completely takes, for text fragments in two documents having M and N text fragments (for example, paragraphs) respectively, takes M×N comparisons. The analysis cannot be performed mentally or using paper and pen methods alone. Task processing grows exponentially if one considers breaking text fragments into sub-fragments.

Using traditional word processor and PDF viewer applications, a user must use keystrokes to enter text into search bars, and mouse or trackpad gestures and clicks to position windows and text on a screen and to scroll through them. When performed on a computer, the task becomes prohibitively long and inefficient. Embodiments of the invention solve this problem by selecting, analyzing, and displaying the right text fragments in the right place at the right time, to speed up user examination of documents, their semantic similarities, and to identify and evaluate arguments for or against textual similarity when it has been asserted, or against textual dissimilarity when it has been asserted.

Figure 5:
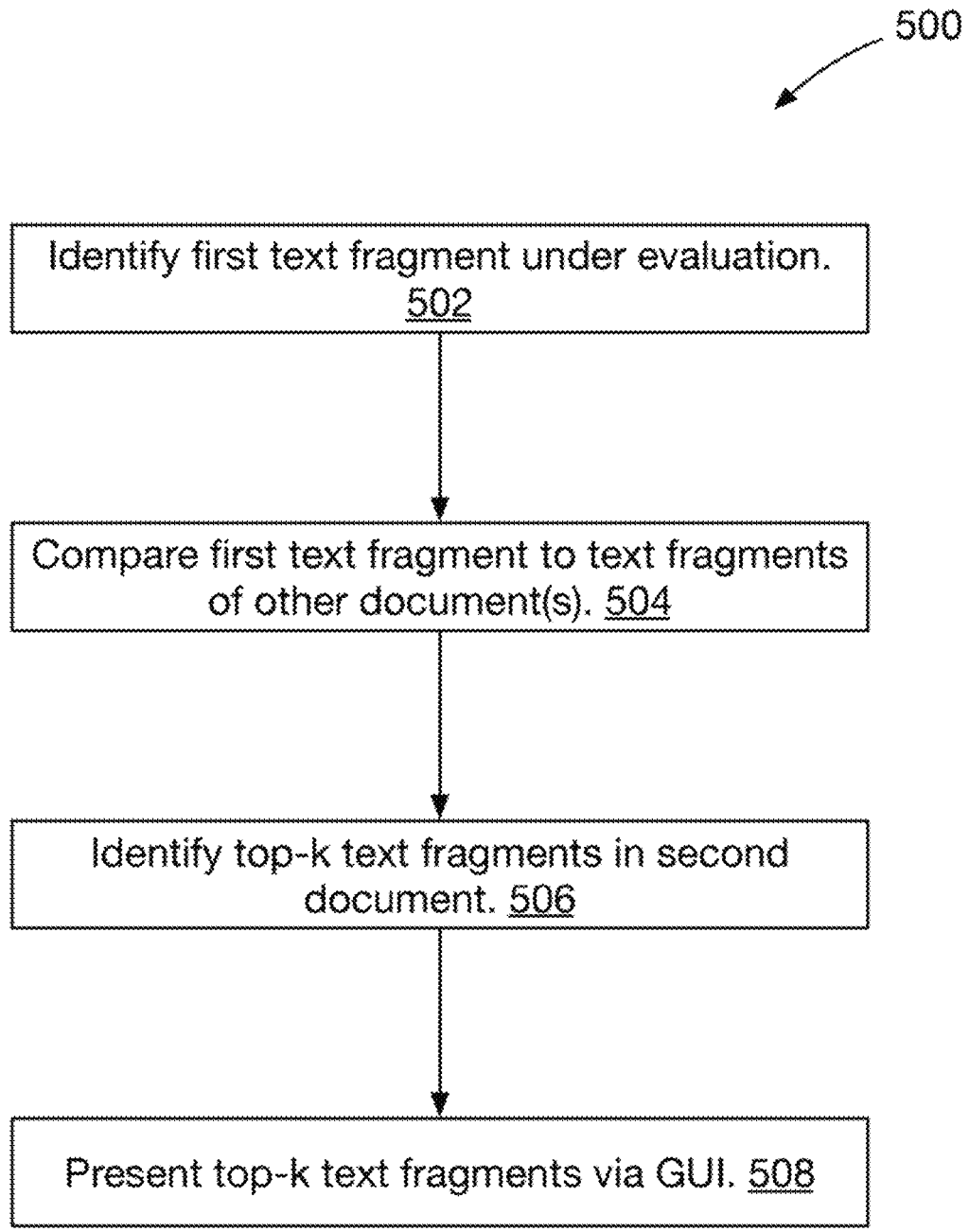
FIG. 5 is an illustrative flowchart of a method 500, according to an embodiment of the invention.

FIG. 5 is an illustrative flowchart of a method 500, according to an embodiment of the invention.

Referring now to FIGS. 1 and 5, program 106 identifies (step 502) a first text fragment as being under evaluation, wherein the first text is in at least a first document being compared to a second document using a first semantic model. Program 106 compares (step 504) the first text fragment to one or more text fragments of the second document. Program 106 identifies (step 506) top-k text fragments in the second document that are most similar to the first text fragment based on processing using the first semantic model. Program 106 presents (step 508) a user, via a graphical user interface (GUI), the top-k text fragments in visual proximity to the first text fragment.

In an embodiment, program 106 identifies (not shown) indicia of dissimilarity between the first text fragment and the top-k text fragments using the first semantic model or a second semantic model.

In an embodiment, program 106 identifies (not shown) a first text fragment as being under evaluation by detecting (not shown) a comparison between the first text fragment and a second text fragment.

In an embodiment, program 106 detects (not shown) a comparison between the first text fragment and at least one other text fragment by detecting a semantic score generated based on a comparison of the first text fragment and the second text fragment.

In an embodiment, program 106 detects a comparison between the first text fragment and at least one other text fragment by detecting a semantic analysis between the first text fragment and the second text fragment, the semantic analysis comprising a natural language statement in the first document, the second document, or a third document.

In an embodiment, presenting a user, via a graphical user interface (GUI), the top-k text fragments in visual proximity to the first text fragment, is performed by displaying a first word in the first text fragment using a first visual style, wherein the displaying indicates that the first word is missing from a second text fragment in at least one of the top-k text fragments.

In an embodiment, the displaying is performed by displaying a second word in the second text fragment using the first visual style or another visual style, wherein the displaying indicates that the second word is missing from the first text fragment.

In an embodiment, presenting a user, via a graphical user interface (GUI), the top-k text fragments in visual proximity to the first text fragment, is performed by displaying a first word in the first text fragment using a first visual style, wherein the displaying indicates that the first word is semantically identical or similar to a word in a second text fragment in at least one of the top-k text fragments.

In an embodiment, the displaying is performed by displaying a second word in the second text fragment using the first visual style or another visual style, wherein the displaying indicates that the second word is semantically identical or similar to the first word.

In an embodiment, the first semantic model comprises a machine learning model.

In an embodiment, the first semantic model comprises a word embedding model.

In an embodiment, the first semantic model comprises a bag-of-words model.

In an embodiment, similarity and dissimilarity determinations may be made using a list of synonyms and antonyms generated from two texts under comparison. The list may be displayed in the disclosed GUIs or a separate GUI that allows the user to compare and determine which words or phrases should be examined in more detail to understand the reasons and evidence for determinations of similarity or dissimilarity. Allowing the user to view this information may enable some non-AI functions; but also enables the user to make a decision without understanding details of machine learning or AI, which otherwise may be necessary to explain scores or determinations provided.

In an embodiment, the text fragments can be split into subject, object and action, and these categories can be displayed to the user for examination. The user can compare the three blocks (subject, object, action) each from the two texts and evaluate their similarities and dissimilarities using a visual inspection.

According to an embodiment of the invention, in some NLP applications, word embedding models refer to unsupervised shallow neural networks that operate on input tokens to generate semantic vectors. The quality of the word embedding models depends on the quality of the training dataset (also referred to as "training corpus") used to train them. Although embodiments of the invention are described in connection with word embedding models, persons of ordinary skill in the art will appreciate that they are applicable to other NLP applications and models, without departing from the spirit or scope of the claimed invention.

For instance, consider that during a training phase of generating an embedding model, there will almost certainly be tokens (words or phrases) that are missing from (or are "unobserved" or "unrecognized" in) the training corpus. Thereafter, when the trained embedding model is used to process new input text (so as to generate semantic vectors for the new input text), the trained embedding model may receive missing or unobserved tokens as input.

In the prior art, the missing or unobserved tokens of the new input text are discarded, and no net information is gathered using them. In other words, not only do the missing or unobserved tokens not contribute to the semantic vector, these words are not used to retrain the embedding models. One reason for this approach in the prior art is that using the missing words to improve the embedding model is costly; for example, depending on the size of the data sets, it can take hours or days to retrain the embedding model, as it typically requires reprocessing all training data including the newly observed words.

Figure 6:
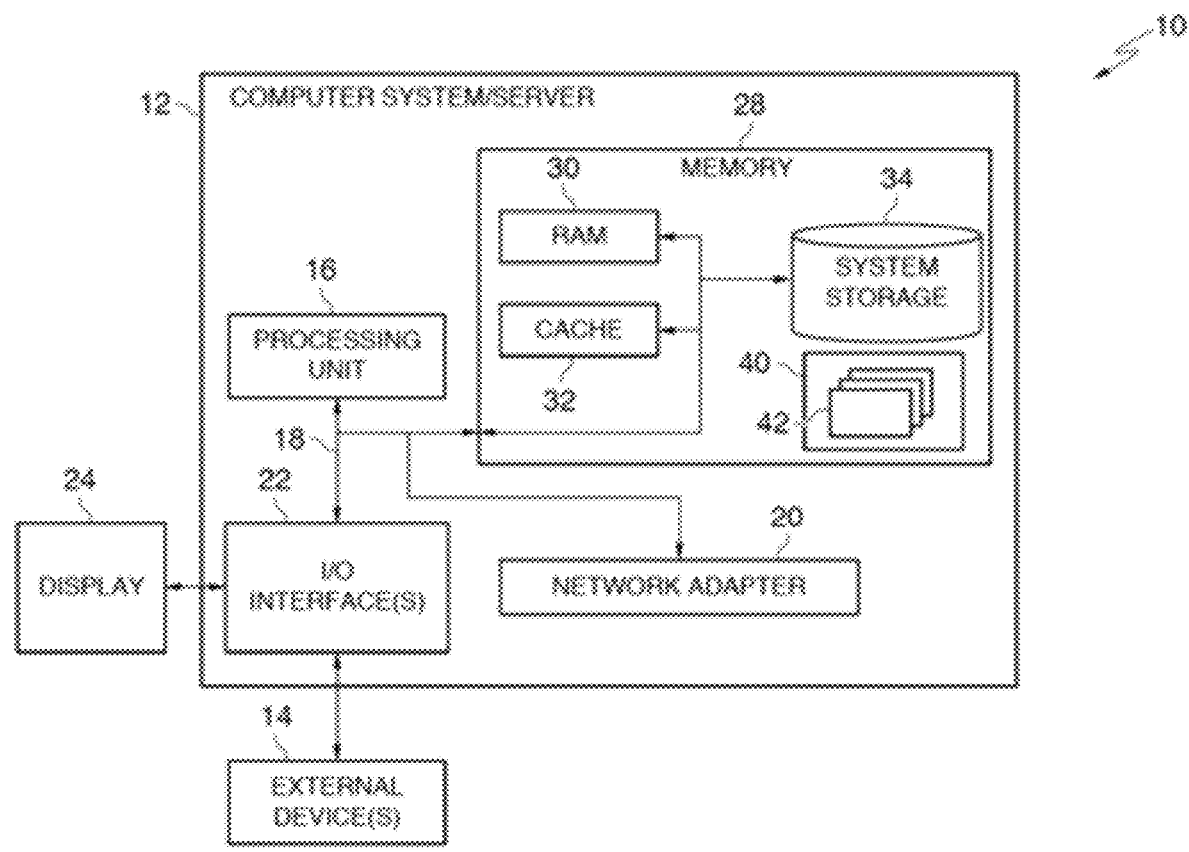
FIG. 6 is a block diagram of an illustrative cloud computing node, according to an embodiment of the invention.

FIG. 6 is a block diagram of an illustrative cloud computing node, according to an embodiment of the invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
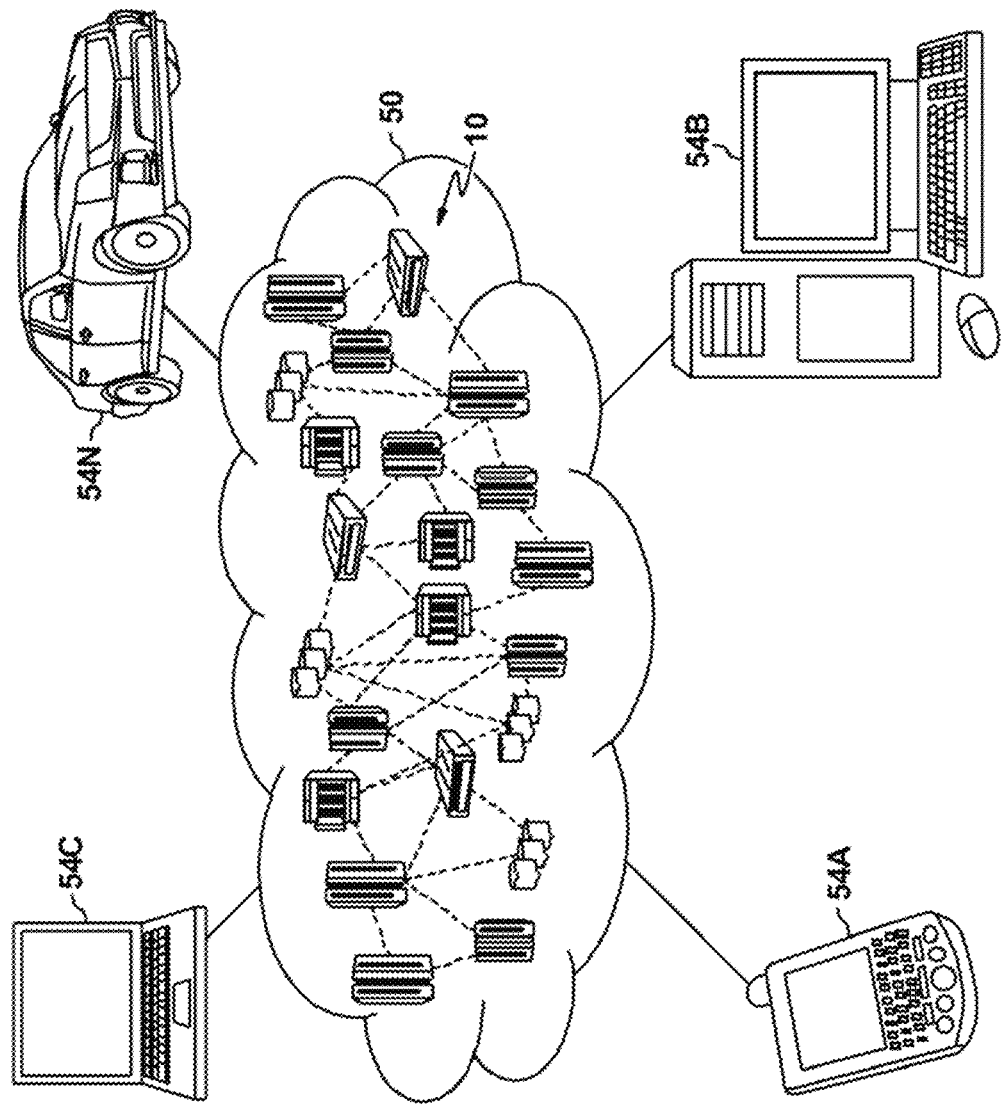
FIG. 7 is a block diagram of a cloud computing environment including the cloud computing node of FIG. 6, according to an embodiment of the invention.

FIG. 7 is a block diagram of a cloud computing environment including the cloud computing node of FIG. 6, according to an embodiment of the invention. Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Figure 8:
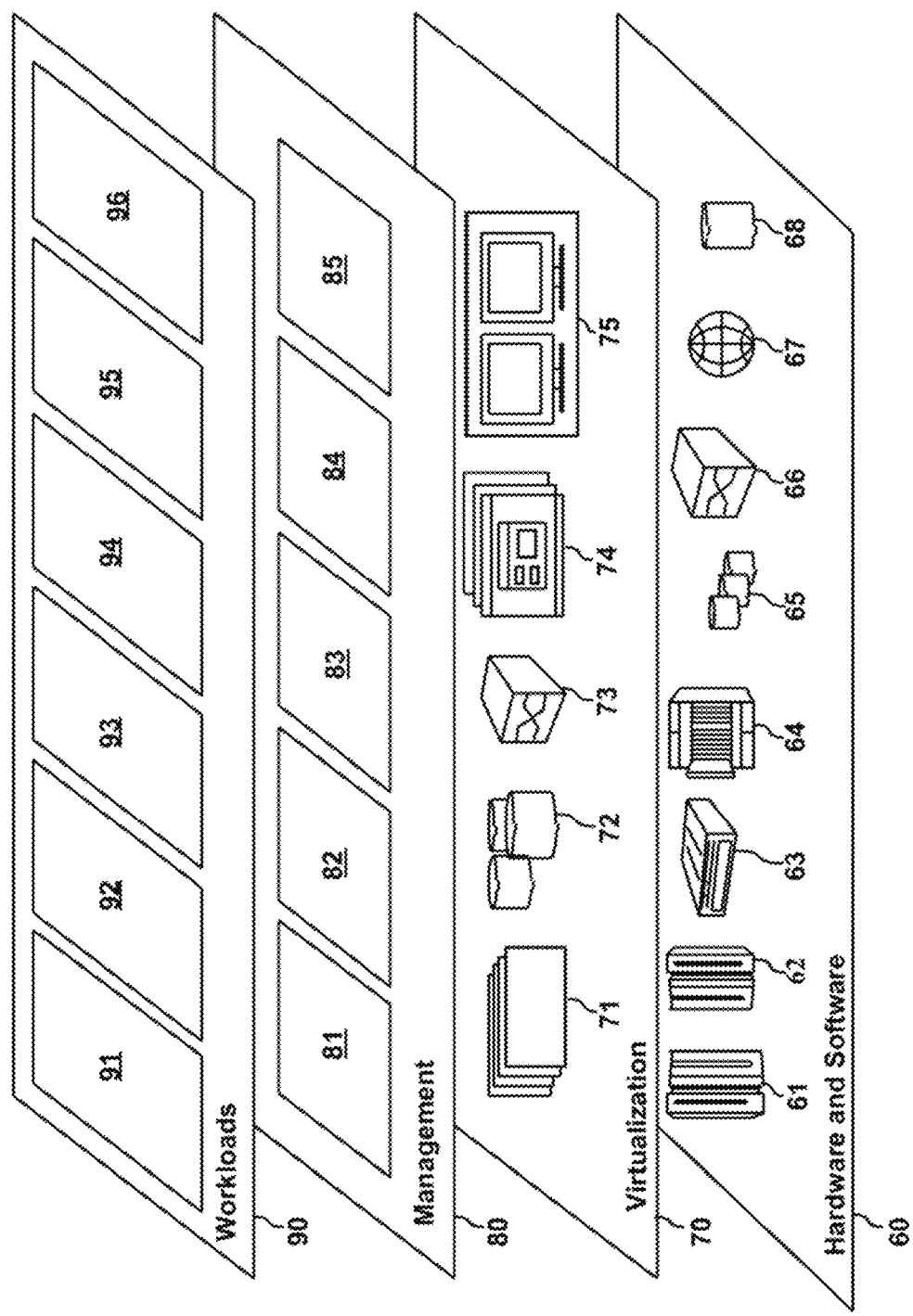
FIG. 8 is a block diagram of functional layers of the cloud computing environment of FIG. 7, according to an embodiment of the invention.

FIG. 8 is a block diagram of functional layers of the cloud computing environment of FIG. 7, according to an embodiment of the invention. Referring now to FIG. 8, a set of functional abstraction layers provided by cloud computing environment 50 is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and semantic comparison 96, including those described in connection with FIGS. 1-5, above.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
   identifying a first text fragment paragraph as being under evaluation, wherein the first text fragment paragraph is a paragraph in at least a first document being compared to a second document using a first semantic model;
   comparing the first text fragment paragraph to one or more text fragment paragraphs of the second document;
   identifying top-k text fragment paragraphs in the second document that are most similar to the first text fragment paragraph based on processing using the first semantic model; and
   presenting a user, via a graphical user interface (GUI), the top-k text fragment paragraphs in visual proximity to the first text fragment paragraph.

2. The method of claim 1, further comprising:
   identifying indicia of dissimilarity between the first text fragment paragraph and the top-k text fragment paragraphs using the first semantic model or a second semantic model; and
   displaying the identified indicia of dissimilarity on the graphical user interface within the top-k text fragment paragraphs and the first text fragment paragraph.

3. The method of claim 1, wherein identifying a first text fragment paragraph as being under evaluation comprises:
  detecting a comparison between the first text fragment paragraph and a second text fragment paragraph.

4. The method of claim 3, wherein detecting a comparison between the first text fragment paragraph and at least one other text fragment paragraph comprises:
  detecting a semantic score generated based on a comparison of the first text fragment paragraph and the second text fragment paragraph.

5. The method of claim 3, wherein detecting a comparison between the first text fragment paragraph and at least one other text fragment paragraph comprises:
  detecting a semantic analysis between the first text fragment paragraph and the second text fragment paragraph, the semantic analysis comprising a natural language statement in the first document, the second document, or a third document.

6. The method of claim 1, wherein presenting a user, via the graphical user interface (GUI), the top-k text fragment paragraphs in visual proximity to the first text fragment paragraph, comprises:
  displaying a first word in the first text fragment paragraph using a first visual style, wherein the displaying indicates that the first word is missing from a second text fragment paragraph in at least one of the top-k text fragment paragraphs.

7. The method of claim 6, further comprising:
  displaying a second word in the second text fragment paragraph using the first visual style or another visual style, wherein the displaying indicates that the second word is missing from the first text fragment paragraph.

8. The method of claim 1, wherein presenting a user, via the graphical user interface (GUI), the top-k text fragment paragraphs in visual proximity to the first text fragment paragraph, comprises:
  displaying a first word in the first text fragment paragraph using a first visual style, wherein the displaying indicates that the first word is semantically identical or similar to a word in a second text fragment paragraph in at least one of the top-k text fragment paragraphs.

9. The method of claim 8, further comprising:
  displaying a second word in the second text fragment paragraph using the first visual style or another visual style, wherein the displaying indicates that the second word is semantically identical or similar to the first word.

10. The method of claim 1, wherein the first semantic model comprises a machine learning model.

11. The method of claim 1, wherein the first semantic model comprises a word embedding model.

12. The method of claim 1, wherein the first semantic model comprises a bag-of-words model, the bag-of-words model representing a text as a multiset of its constituent words.

13. The method of claim 1, wherein when presenting via the graphical user interface (GUI) the top-k text fragment paragraphs in visual proximity to the first text fragment paragraph, differences and similarities between the top-k text fragment paragraphs and the first text fragment paragraphs are displayed in different colors.

14. A computer program product comprising programming instructions embodied one or more tangible storage media, the programming instructions being executable by one or more processors to perform a method, the programming instructions comprising instructions for:
  identifying a first text fragment paragraph as being under evaluation, wherein the first text fragment paragraph is a paragraph in at least a first document being compared to a second document using a first semantic model;
  comparing the first text fragment paragraph to one or more text fragment paragraphs of the second document;
  identifying top-k text fragment paragraphs in the second document that are most similar to the first text fragment based on processing using the first semantic model; and
  presenting a user, via a graphical user interface (GUI), the top-k text fragment paragraphs in visual proximity to the first text fragment paragraph.

15. A computer system, comprising:
  one or more processors; and
  one or more tangible storage media storing programming instructions for execution by the one or more processors to perform a method, the programming instructions comprising instructions for:
    identifying a first text fragment paragraph as being under evaluation, wherein the first text fragement paragraph is a paragraph in at least a first document being compared to a second document using a first semantic model;
    comparing the first text fragment paragraph to one or more text fragment paragraphs of the second document;
    identifying top-k text fragment paragraphs in the second document that are most similar to the first text fragment paragraph based on processing using the first semantic model; and
    presenting a user, via a graphical user interface (GUI), the top-k text fragment paragraphs in visual proximity to the first text fragment paragraph.

* * * * *